UNITED STATES PATENT OFFICE.

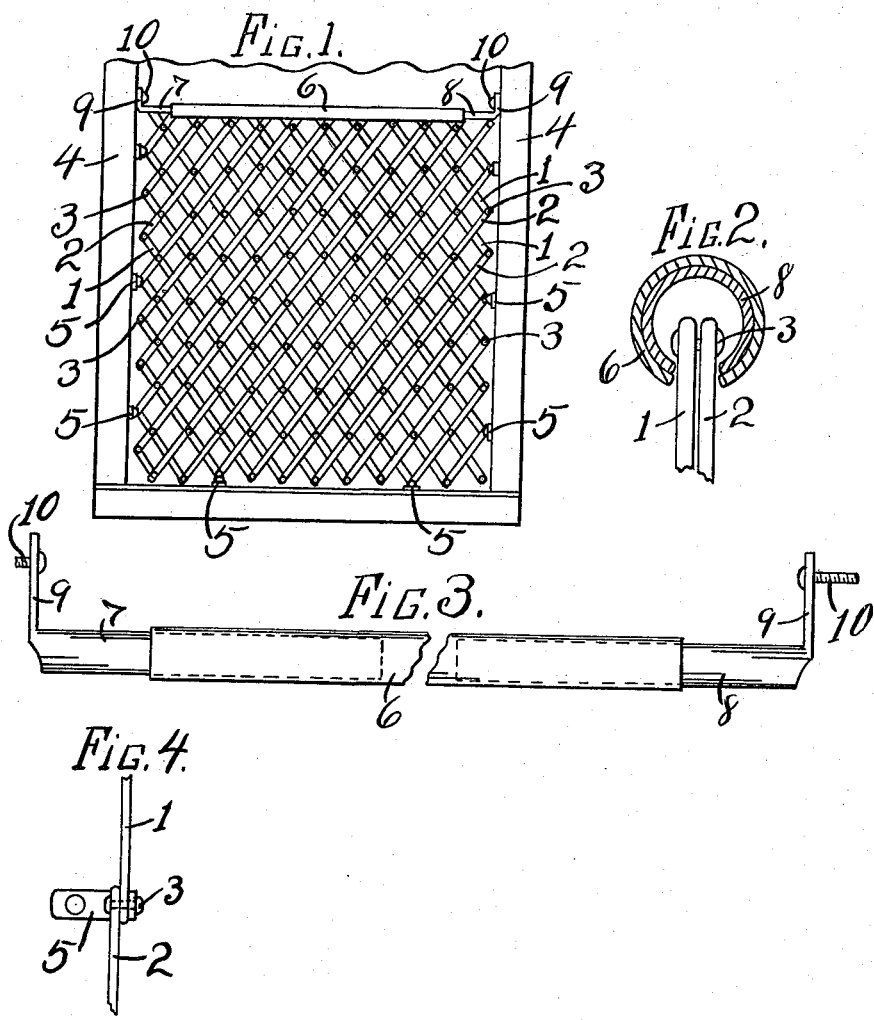

HOWARD L. AGEE AND SIDNEY A. AGEE, OF FORT WORTH, TEXAS.

GUARD FOR DOORS AND THE LIKE.

1,215,462.  Specification of Letters Patent.  Patented Feb. 13, 1917.

Application filed November 9, 1916. Serial No. 130,342.

*To all whom it may concern:*

Be it known that we, HOWARD L. AGEE and SIDNEY A. AGEE, citizens of the United States, residing at Fort Worth, in the county of Tarrant and State of Texas, have invented certain new and useful Improvements in Guards for Doors and the like, of which the following is a specification.

Our invention relates to door guards and more particularly to adjustable and expansible guards for doors and other openings; and the object is to provide door guards at small cost which are adjustable so that they can be attached to the frames of any door of ordinary size, that is, doors with ordinary variations in width and to provide inexpensive door guards which can be made rigid at their upper or lower edges or at both upper and lower edges by simple adjustable devices. Other objects and advantages will be fully explained in the following description and the invention will be more particularly pointed out in the claims.

Reference is had to the accompanying drawings which form a part of this application.

Figure 1 is a face view of a door guard attached to a frame. Fig. 2 is an enlarged vertical section of the adjustable bracing members. Fig. 3 is a plan view of the same. Fig. 4 is a detail view of a bracket for attaching the guard to a frame.

Similar characters of reference are used to indicate the same parts throughout the several views.

This improved guard includes a lazy-tongs construction and the guard has two series of flat metal bars 1 and 2 which are placed angularly across each other and connected to each other by pivot bolts or rivets 3 so that the bars will be movable relative to each other for the purpose of expanding the guard or contracting the guard or for folding the guard. This construction makes it possible to fold the guard into a very small space. The guard may be attached to the side frame pieces 4 by brackets 5, using as many brackets 5 as may be advisable. The brackets 5 are L-shaped so that they can be attached to the ends of two cross bars 1 and 2 by a pivot bolt 3. This construction will make the lateral edges of the guard as rigid as is desirable. The top edge is made rigid by slotted tubular members 6 and 7 and 8 and the members 7 and 8 telescope into the member 6. The members 7 and 8 have ears 9 bent at right angles thereto to be attached to door frame 4 by suitable screws 10. The members 6, 7, and 8 have slots in the under sides thereof to receive the ends of the bars 1 and 2 which are pivotally connected together by pivot bolts 3. The members 7 and 8 will move with the lower sides thereof sliding under the bolts 3 so that these members will not be separated from the guard. The tubular members 7 and 8 will be braced by the tubular member 6 and the three members form a brace for the upper edge of the guard and the lower edge also if desired. The brace will be extensible with the expansion of the guard and on contraction of the guard the members 7 and 8 will telescope into the member 6. The structure herein set forth is adaptable for doors or windows or other openings and attaching devices must be varied according to the uses to which the guards are applied.

What we claim is,—

1. A door guard comprising an expansible member consisting of flat metal bars crossing each other at angles and pivot bolts connecting the cross-bars together at their crossings and at their ends, means for attaching the lateral edges of said expansible member to the door frame, and an extensible brace consisting of tubular members telescoping together and having slots in the lower sides thereof for engaging the upper edge of said expansible member and held in engagement therewith by the pivot bolts in the upper ends of said metal bars.

2. A door guard comprising an expansible member consisting of flat metal bars crossing each other at angles and pivot bolts connecting the cross-bars at their crossings and at their ends, brackets for attaching the lateral edges of said expansible member to the door frame, and an extensible brace for the upper and lower edges of said expansible member consisting of tubular telescopic members having longitudinal slots to receive the edges of said expansible member and held in engagement therewith by the heads of said pivot bolts.

3. A door guard comprising an expansible member consisting of flat metal bars crossing each other at angles and pivotally connected together, brackets for attaching the lateral edges of said expansible member to the frame, extensible braces for the upper and lower edges of said expansible member consisting of tubular telescopic members having lugs at their outer ends for attaching the extensible member to the frame and having longitudinal slots in the sides to receive the edges of said expansible member, and means for holding said extensible members in operative relation with said expansible member.

In testimony whereof, we set our hands, this 1st day of November, 1916.

HOWARD L. AGEE.
SIDNEY A. AGEE.

Copies of this patent may be obtained for five cents each, by addressing the "Commissioner of Patents, Washington, D. C."